(12) United States Patent
Luders et al.

(10) Patent No.: US 10,705,526 B1
(45) Date of Patent: *Jul. 7, 2020

(54) HANDLING SENSOR OCCLUSIONS FOR AUTONOMOUS VEHICLES

(71) Applicant: Waymo LLC, Mountain View, CA (US)

(72) Inventors: Brandon Douglas Luders, Sunnyvale, CA (US); Vadim Furman, Los Gatos, CA (US); Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/162,978

(22) Filed: Oct. 17, 2018

Related U.S. Application Data

(63) Continuation of application No. 15/299,764, filed on Oct. 21, 2016, now Pat. No. 10,146,223.

(51) Int. Cl.
  *G05D 1/00* (2006.01)
  *G05D 1/02* (2020.01)

(52) U.S. Cl.
  CPC ......... *G05D 1/0088* (2013.01); *G05D 1/0212* (2013.01)

(58) Field of Classification Search
  CPC .......................... G05D 1/0088; G05D 1/0212
  See application file for complete search history.

(56) References Cited

U.S. PATENT DOCUMENTS

| 8,457,827 | B1 | 6/2013 | Ferguson et al. |
|---|---|---|---|
| 9,248,834 | B1 | 2/2016 | Ferguson et al. |
| 9,367,065 | B2 | 6/2016 | Dolgov et al. |
| 9,440,647 | B1 | 9/2016 | Sucan et al. |
| 2013/0197736 | A1 | 8/2013 | Zhu et al. |
| 2017/0115387 | A1* | 4/2017 | Luders ............ G01S 7/4972 |

OTHER PUBLICATIONS

Galceran, Enric et al., "Augmented Vehicle Tracking under Occlusions for Decision-Making in Autonomous Driving" (2015) 7 pgs.

* cited by examiner

*Primary Examiner* — Yuen Wong
(74) *Attorney, Agent, or Firm* — Botos Churchill IP Law

(57) ABSTRACT

The technology relates to identifying sensor occlusions due to the limits of the ranges of a vehicle's sensors and using this information to maneuver the vehicle. As an example, the vehicle is maneuvered along a route that includes traveling on a first roadway and crossing over a lane of a second roadway. A trajectory is identified from the lane that will cross with the route during the crossing at a first point. A second point beyond a range of the vehicle's sensors is selected. The second point corresponds to a hypothetical vehicle moving towards the route along the lane. A distance between the first point and the second point is determined. An amount of time that it would take the hypothetical vehicle to travel the distance is determined and compared to a threshold amount of time. The vehicle is maneuvered based on the comparison to complete the crossing.

18 Claims, 16 Drawing Sheets

HANDLING SENSOR OCCLUSIONS FOR AUTONOMOUS VEHICLES

CROSS-REFERENCE TO RELATED APPLICATIONS

The present application is a continuation of U.S. patent application Ser. No. 15/299,764, filed Oct. 21, 2016, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

Aspects of the disclosure provide methods for maneuvering a vehicle. As an example, a method includes maneuvering, by one or more processors of one or more computing devices, a vehicle along a route. The route includes the vehicle traveling on a first roadway and crossing over at least one lane of traffic of a second roadway. The method also includes identifying, by the one or more processors, a trajectory from the at least one lane of traffic from the second roadway that will cross with the route during the crossing at a first point; selecting, by the one or more processors, a second point beyond a range of sensors of the vehicle. The second point corresponds to a hypothetical vehicle moving towards the route along the at least one lane of traffic. The method also includes determining, by the one or more processors, a distance between the first point and the second point; determining, by the one or more processors, an amount of time that it would take the hypothetical vehicle to travel the distance; comparing the amount of time to a threshold amount of time; and maneuvering, by the one or more processors, the vehicle based on the comparison in order to complete the crossing.

In one example, the range of the sensors is defined as a point or distance at or beyond which the sensors are no longer providing information on detected objects with an acceptable reliability value. In another example, the crossing involves an unprotected left-hand turn where the vehicle does not have the right of way over the at least one lane of traffic. In another example, the crossing involves an unprotected crossing of an intersection where the vehicle does not have the right of way over the at least one lane of traffic. In another example, the crossing involves the vehicle crossing the at least one lane of traffic and merging with a second lane of traffic after making a turn into the second lane of traffic. In this example, the method also includes identifying a second trajectory from the second lane of traffic that will cross with the route during the turn at a third point; selecting a fourth point beyond a range of sensors of the vehicle, the fourth point corresponding to a second hypothetical vehicle moving towards the route along the second lane of traffic; determining a distance between the third point and the fourth point; determine a second amount of time it would take the second hypothetical vehicle to travel the distance; comparing the second amount of time to a second threshold amount of time; and maneuvering the vehicle based on the comparison of the second amount of time to the second threshold amount of time to complete the turn. In another example, determining the amount of time is based on an assumption that the hypothetical vehicle is moving at a particular speed. In this example, the method also includes determining the particular speed using a legal speed limit for the second roadway plus a percentage of the speed limit. In another example, the method also includes using pre-stored map information to select the second point where in the pre-stored map information identifies a merge point beyond the range of the sensors.

In another example, the crossing involves the vehicle crossing the at least one lane of traffic and merging with a second lane of traffic after making a turn into the second lane of traffic. In this example, the method also includes receiving sensor data indicating that a second vehicle is located within the second lane of traffic and within the range of the sensors, and determining not to select a point beyond the range of the sensors for a hypothetical vehicle in the second lane of traffic based on the location of the second vehicle. In another example, the method also includes receiving sensor data indicating that a second vehicle is at a location within the second lane of traffic and within the range of the sensors, and wherein determining the amount of time includes setting a bound on the amount of time based on the location of the second vehicle. In another example, the sensor data further indicates that the second vehicle is in a stopped condition, and determining not to select the point is further based on the stopped condition of the second vehicle. In another example, the crossing involves an unprotected right-hand turn where the vehicle does not have the right of way over the at least one lane of traffic. In another example, the method also includes determining the threshold amount of time by selecting a location along the route and beyond the cross point and estimating a second amount of time for the vehicle to reach the location, wherein the second amount of time is the threshold amount of time.

Another aspect of the disclosure provides systems for maneuvering a vehicle. As an example, a system includes one or more computing devices having one or more processors. The one or more processors are configured to maneuver a vehicle along a route. The route includes the vehicle traveling on a first roadway and crossing over at least one lane of traffic of a second roadway. The one or more processors are also configured to identify a trajectory from the at least one lane of traffic from the second roadway that will cross with the route during the crossing at a first point, and select a second point beyond a range of sensors of the vehicle. The second point corresponds to a hypothetical vehicle moving towards the route along the at least one lane of traffic. The one or more processors are also configured to determine a distance between the first point and the second point; determine an amount of time that it would take the hypothetical vehicle to travel the distance; compare the amount of time to a threshold amount of time; and maneuver the vehicle based on the comparison in order to complete the crossing.

In one example, the crossing involves an unprotected crossing of an intersection where the vehicle does not have the right of way over the at least one lane of traffic. In another example, the crossing involves the vehicle crossing the at least one lane of traffic and merging with a second lane of traffic after making a turn into the second lane of traffic. In this example, the one or more computing devices are also configured to identify a second trajectory from the second lane of traffic that will cross with the route during the turn at a third point; select a fourth point beyond a range of sensors of the vehicle, the fourth point corresponding to a second hypothetical vehicle moving towards the route along the second lane of traffic; determine a distance between the third point and the fourth point; determine a second amount of time it would take the second hypothetical vehicle to travel the distance; comparing the second amount of time to a second threshold amount of time; and maneuver the vehicle, based on the comparison of the second amount of time to a second threshold amount of time, to complete the turn. In another example, the crossing involves the vehicle crossing the at least one lane of traffic and merging with a second lane of traffic after making a turn into the second lane of traffic. In this example, the one or more processors are also configured to receive sensor data indicating that a second vehicle is located within the second lane of traffic and within the range of the sensors, and determine not to select a point beyond the range of the sensors for a hypothetical vehicle in the second lane of traffic based on the location of the second vehicle. In another example, the one or more processors are also configured to receive sensor data indicating that a second vehicle is at a location within the second lane of traffic and within the range of the sensors, and determine the amount of time by setting a bound on the amount of time based on the location of the second vehicle. In another example, the system also includes the vehicle.

A further aspect of the disclosure provides non-transitory computer-readable recording mediums on which instructions are stored, the instructions, when executed by one or more processors, cause the one or more processors to perform a method of maneuvering a vehicle. As an example, the method includes maneuvering a vehicle along a route. The route includes the vehicle traveling on a first roadway and crossing over at least one lane of traffic of a second roadway. The method also includes identifying a trajectory from the at least one lane of traffic from the second roadway that will cross with the route during the crossing at a first point, and selecting a second point beyond a range of sensors of the vehicle. The second point corresponds to a hypothetical vehicle moving towards the route along the at least one lane of traffic. The method also includes determining a distance between the first point and the second point; determining an amount of time that it would take the hypothetical vehicle to travel the distance; and comparing the amount of time to a threshold amount of time; and maneuvering the vehicle based on the comparison in order to complete the crossing.

DETAILED DESCRIPTION

Overview

Figure 1:
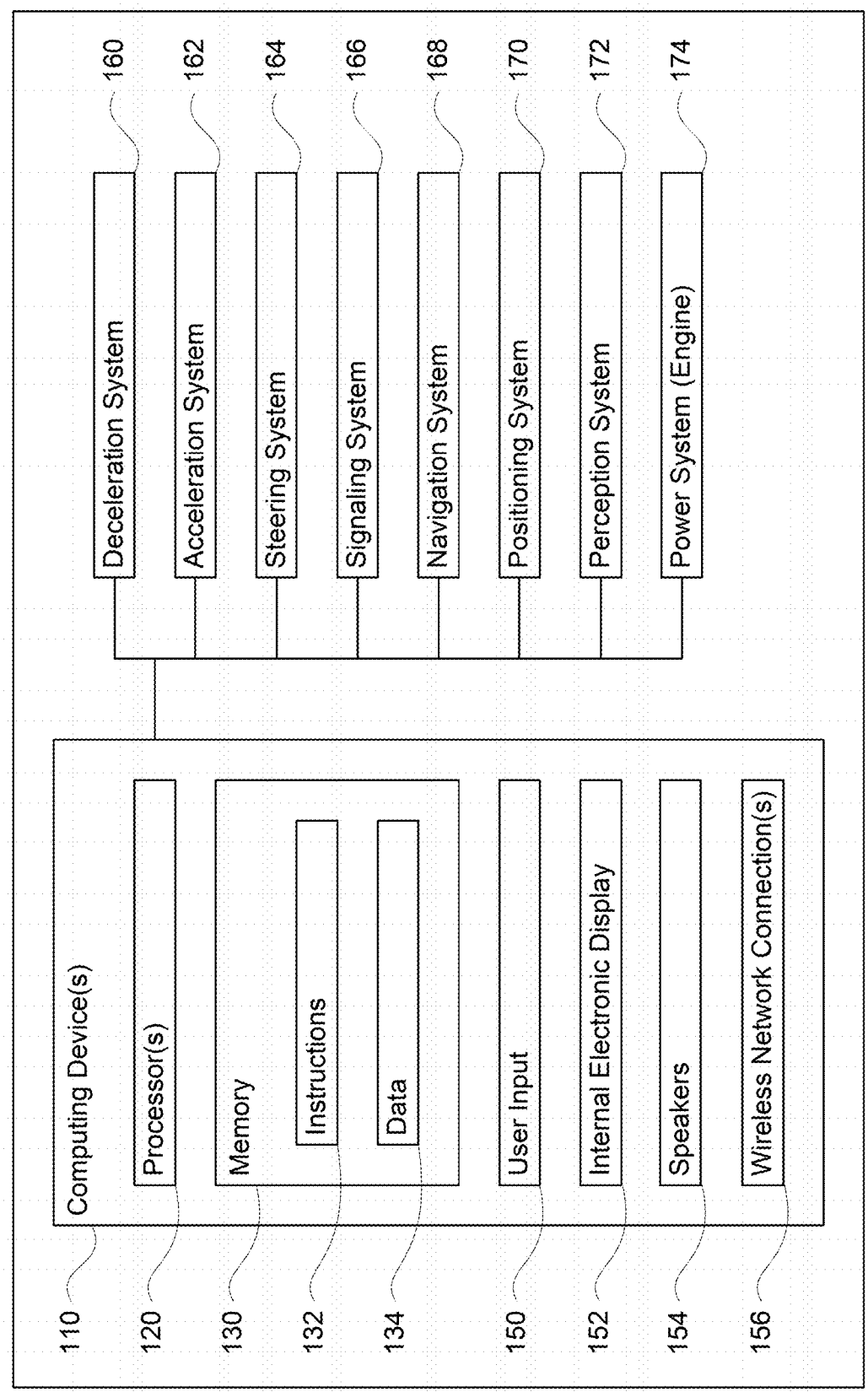
FIG. 1 is a functional diagram of an example vehicle in accordance with an exemplary embodiment.

The technology relates to identifying sensor occlusions due to the limits of the ranges of a vehicle's sensors. In the case of a self-driving or autonomous vehicle, identifying sensor occlusions can be critical to safe operation, especially in circumstances where other vehicles are likely to travel at high rates of speed, covering large distances in small periods of time and may intersect with the vehicle's future path. For instance, the range of a vehicle's sensors (camera, radar, sonar, LIDAR) may be limited to at most on the order of 200 meters in a particular direction from the vehicle. Beyond this range, the vehicle is unable to detect objects. In other words, objects might be present beyond this range, but would not be detected or reported by the vehicle's sensors. In that regard, identifying objects which could be located beyond the range can be used to determine how to control the vehicle safely.

In order to control the vehicle, highly detailed maps of the vehicle's expected environment identifying objects that have been detected and identified at a prior point in time, may be used to determine a route between locations. The route may include a set of road segments as well as some information about how the vehicle is to move between those road segments. As an example, a route can include any number of turns between different roads or road segments.

In many cases, when following the route, the vehicle's computing devices will have to control the vehicle in order to make various turns. For instance, a vehicle may have to make a right turn, a left turn, or cross at an intersection. Making a right turn may involve merging into a lane of traffic, whereas making a left turn may involve crossing over one or more lanes of traffic and merging into another lane of traffic. These crossings and turns may create situations in which the location (on the vehicle) and range of the vehicle's sensors (at that location) may limit the distance that the vehicle's computing devices can "see" in the lanes which the vehicle needs to cross or merge with. In other words, in some instances, vehicles may be located at a point beyond the range of the vehicle's sensors or at a location that is within the range of the vehicle's sensors, but is occluded by another object or other environmental factor. In such instances, the computing devices may have no way to determine that these vehicles are there. In order to account for a vehicle that may or may not exist in these other lanes, the vehicle's computing devices may select a point in each of these lanes that is at or just beyond the range.

Following the lane, the computing devices may then determine a cross point at which a hypothetical vehicle located at the selected point would cross the route. The computing devices may then determine the distance between the selected point and the cross point.

Using the determined distance, the vehicle's computing devices may determine how quickly or an amount of time it would take a hypothetical vehicle to reach each of the cross points from the respective selected point. To do so, the computing devices may make assumptions about the speed of the hypothetical vehicle. For instance, the computing devices may assume that the hypothetical vehicle may move as fast as typical road vehicles are able to travel (i.e. assuming the worst case scenario), some percentage greater than a speed limit for the respective lane (i.e. assuming slightly less than the worst case scenario), or some other relatively high rate of speed.

If the vehicle is able to pass a cross point by at least some minimum distance before the hypothetical vehicle would reach the cross point (or within the determined amount of time), for each of the cross points and lanes, then the vehicle's computing devices can safely maneuver the vehicle to complete the turn. However, if the vehicle cannot do so, the computing devices may control the vehicle in order to "better" see in the direction of any of the lanes. This may involve reorienting the vehicle or simply reorienting a sensor relative to the vehicle, slightly moving the vehicle towards completing the turn, or other similar actions.

In many instances, other vehicles may be visible in the lanes with which the vehicle will cross or merge to follow the route. In such cases, the vehicle may not need to perform such calculations for all lanes, but only those lanes that are unoccupied and for which the flow of traffic is towards the vehicle's route. Similarly, if there is a stopped vehicle, this may also obviate the need for the aforementioned determinations. However, in some instances, if there is a stopped or moving vehicle in a lane, the computing devices may use this vehicle as a bound or limit on how quickly another vehicle behind that vehicle could reach the route.

The features described herein allow a vehicle's computing devices to protect the vehicle from collisions with objects which would otherwise be undetectable due to the limitations of the vehicle's sensors. As such, the computing devices are able to react to such objects thereby dramatically increasing the safety of the vehicle and any passengers or cargo.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

Figure 2:
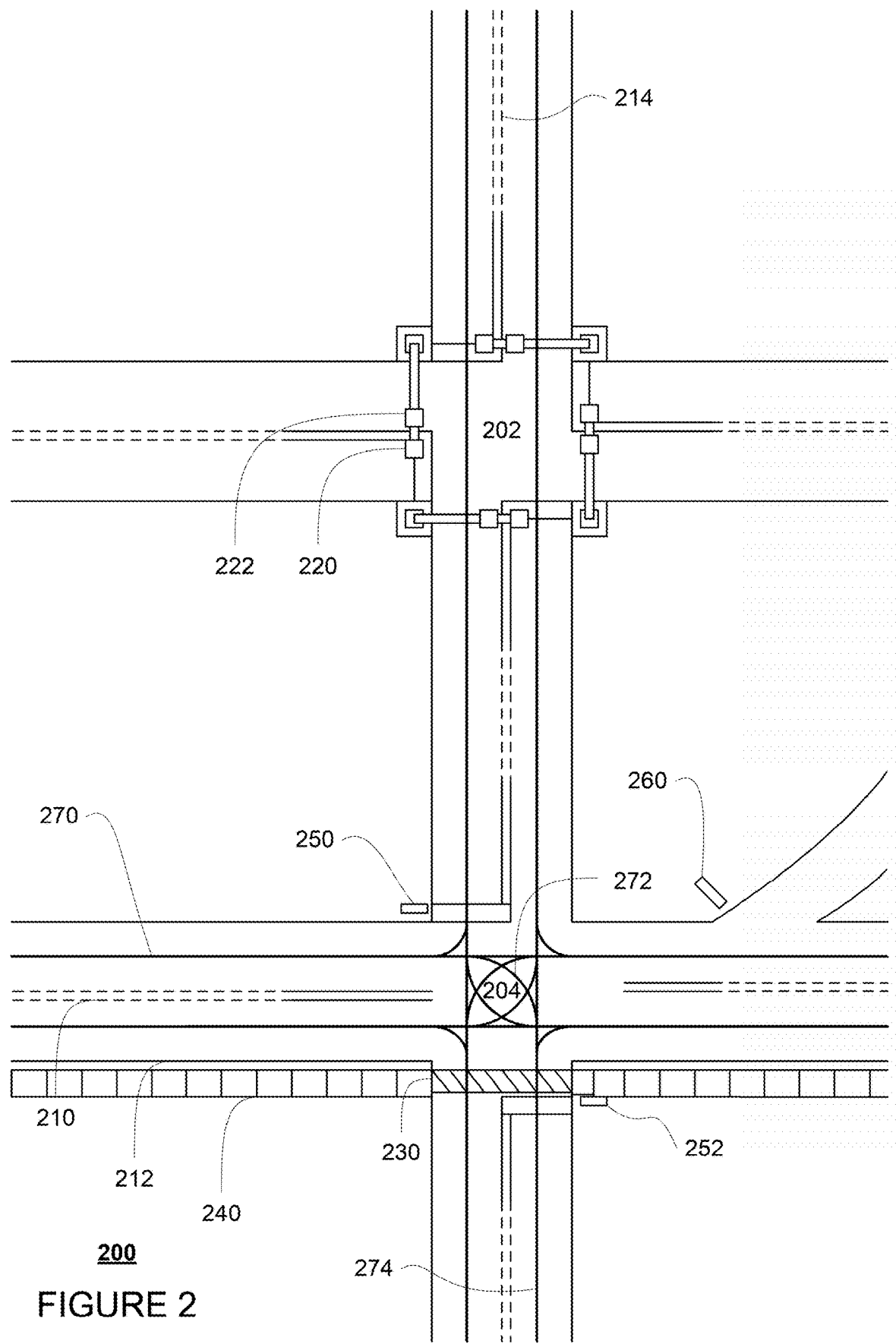
FIG. 2 is a diagram of map information in accordance with an exemplary embodiment.
Figure 3A:
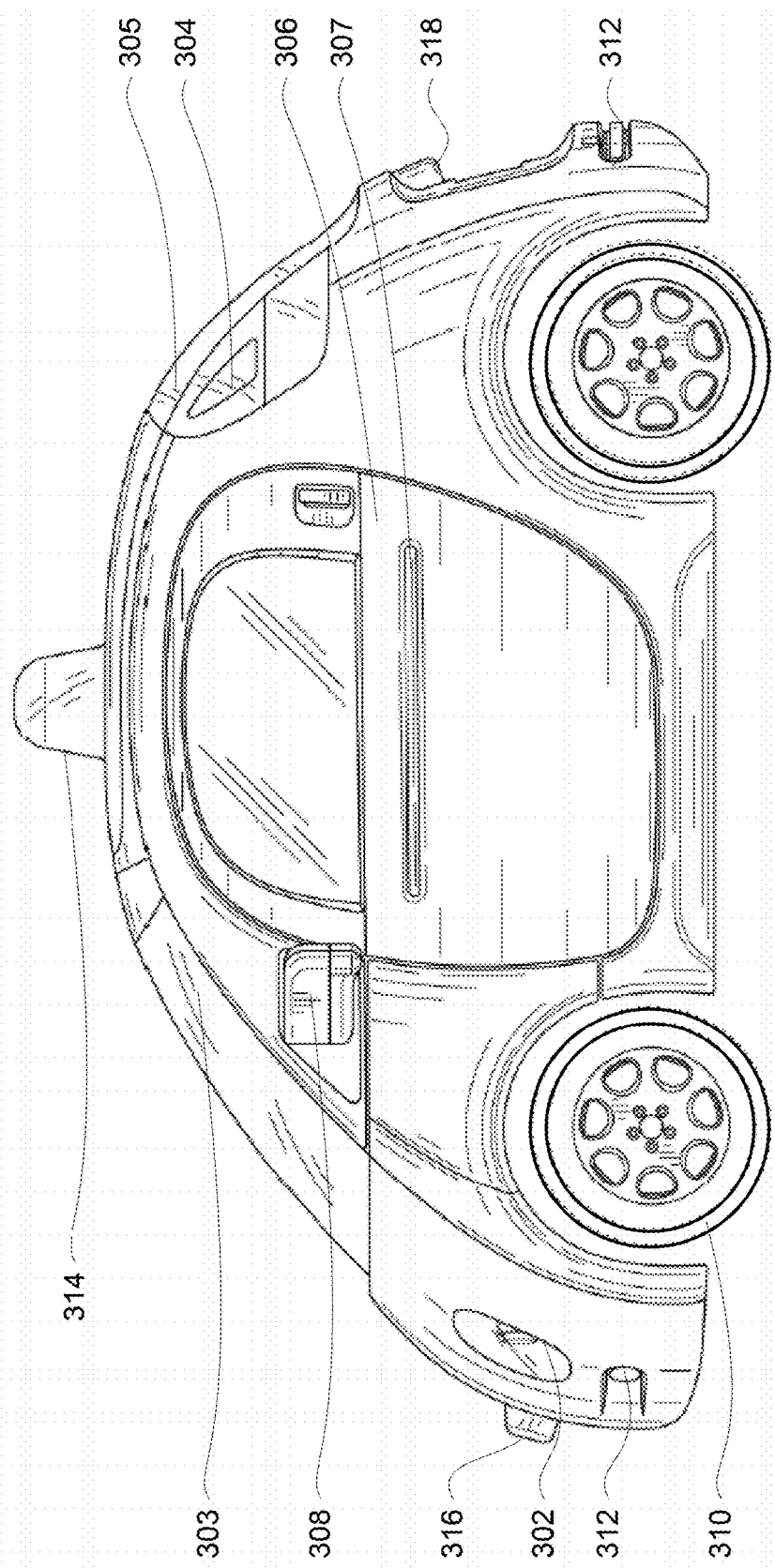
FIGS. 3A-3D are example external views of a vehicle in accordance with aspects of the disclosure.
Figures 3B, 3C:
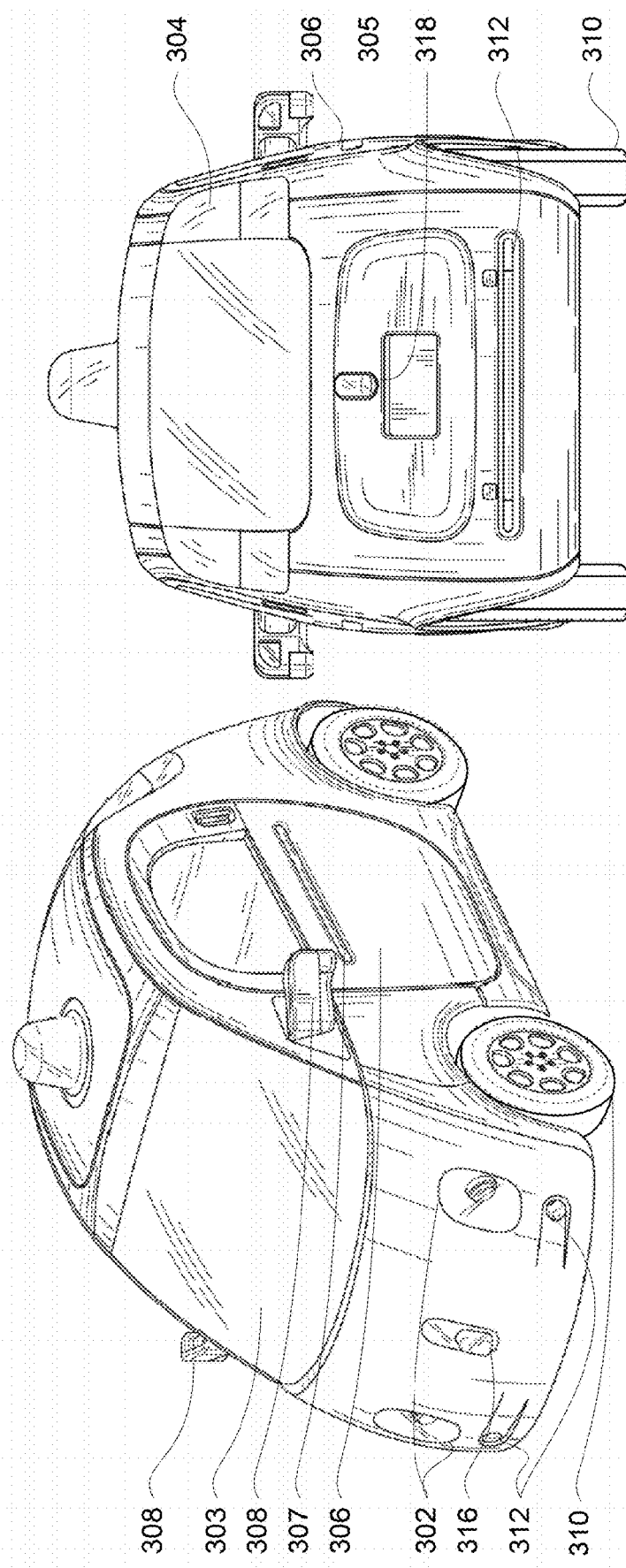
Figure 3D:
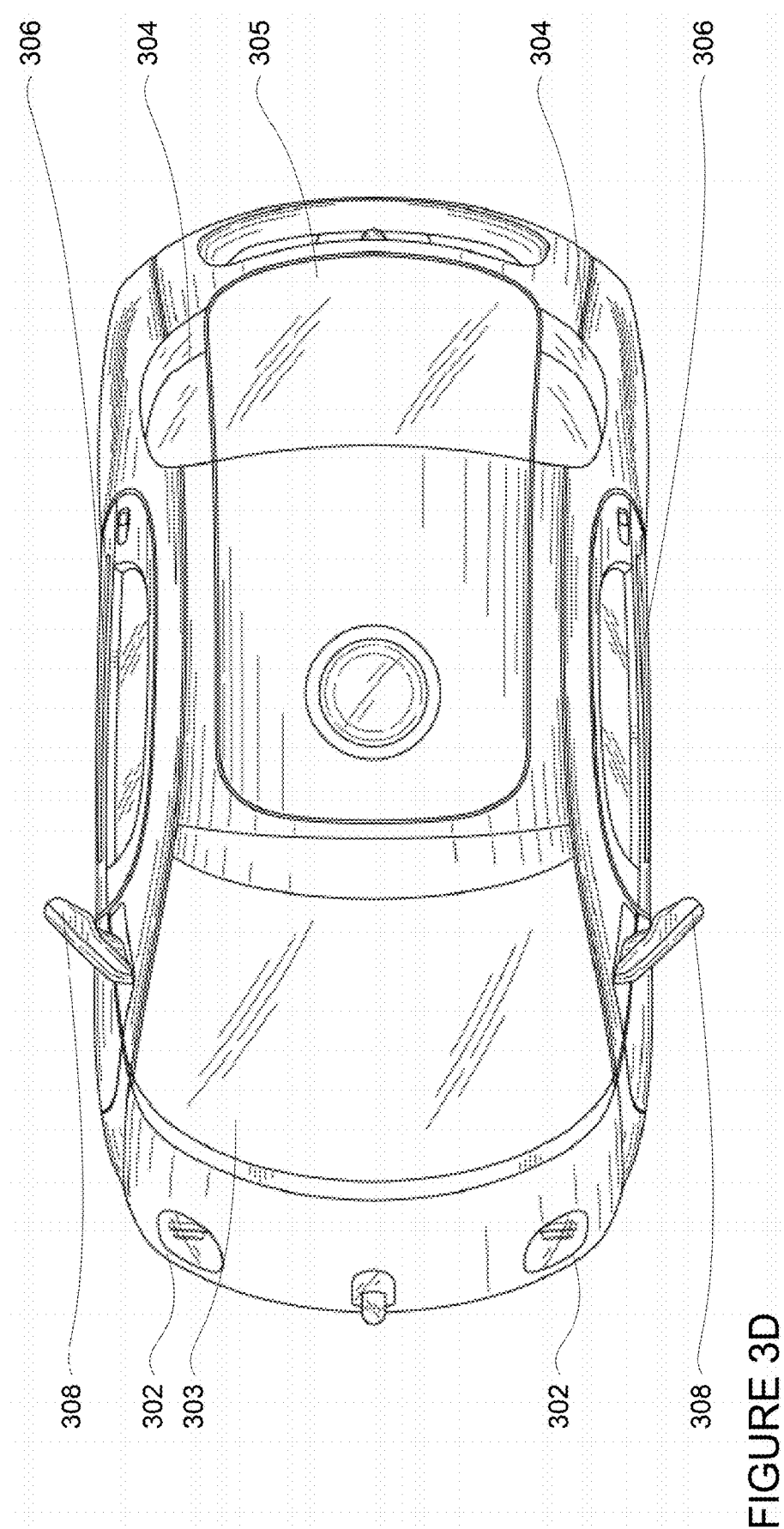

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 274, and may transition to rail 272 in order to make a left turn at intersection 204. Thereafter the vehicle may follow rail 270. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated with the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

Data 134 may store various behavior-time models for predicting an object's future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
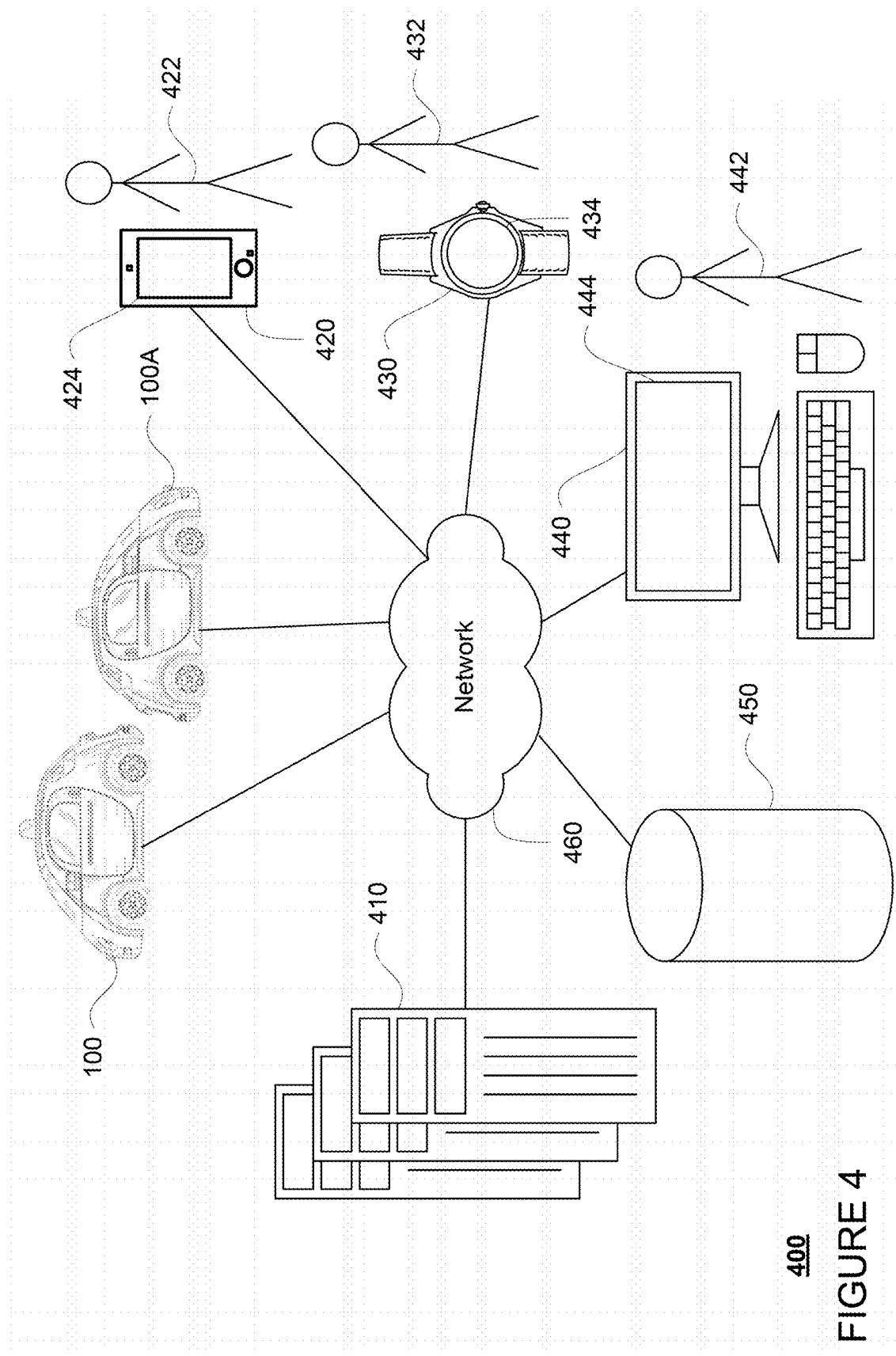
FIG. 4 is a pictorial diagram of a system in accordance with aspects of the disclosure.
Figure 5:
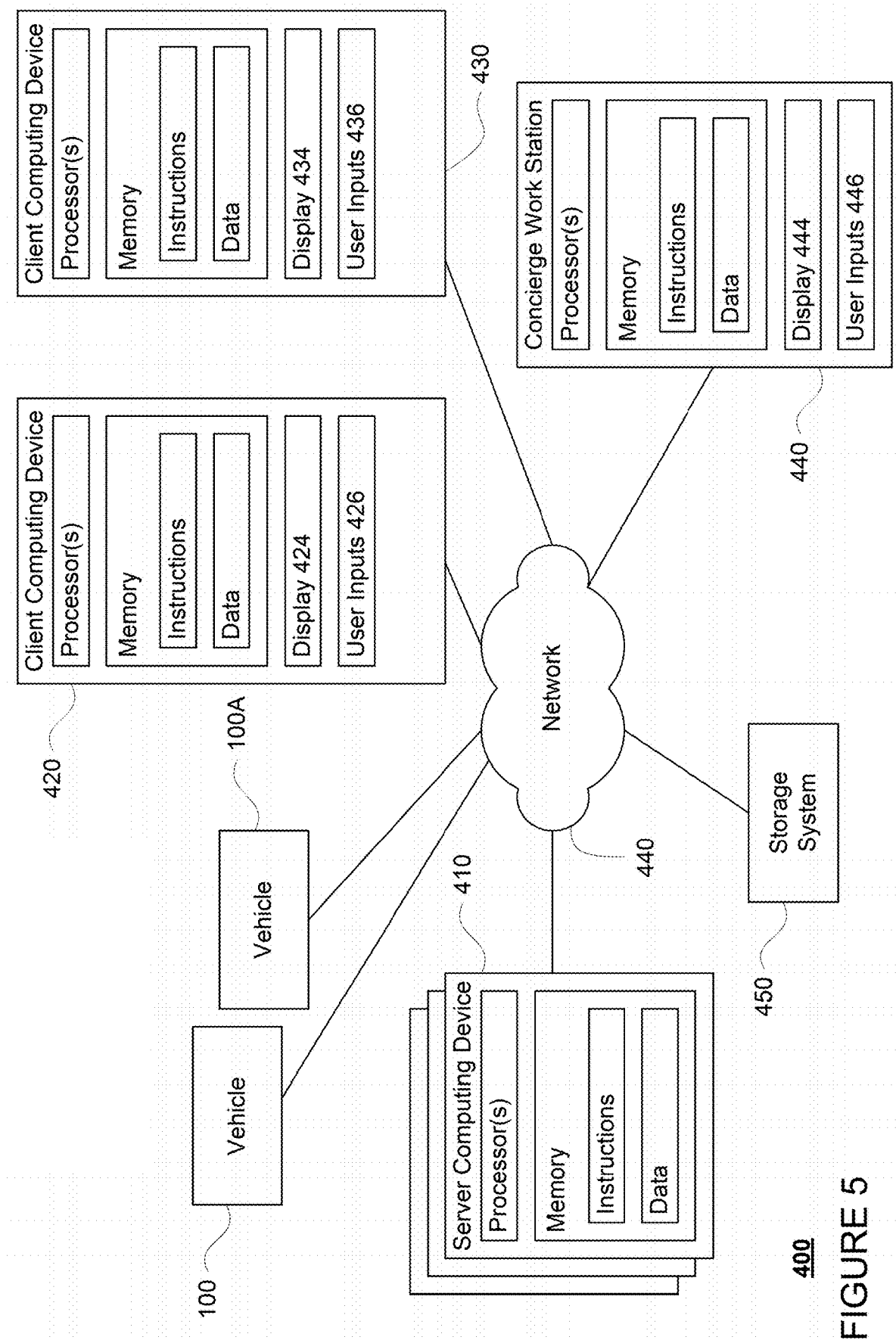
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be a concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 6:
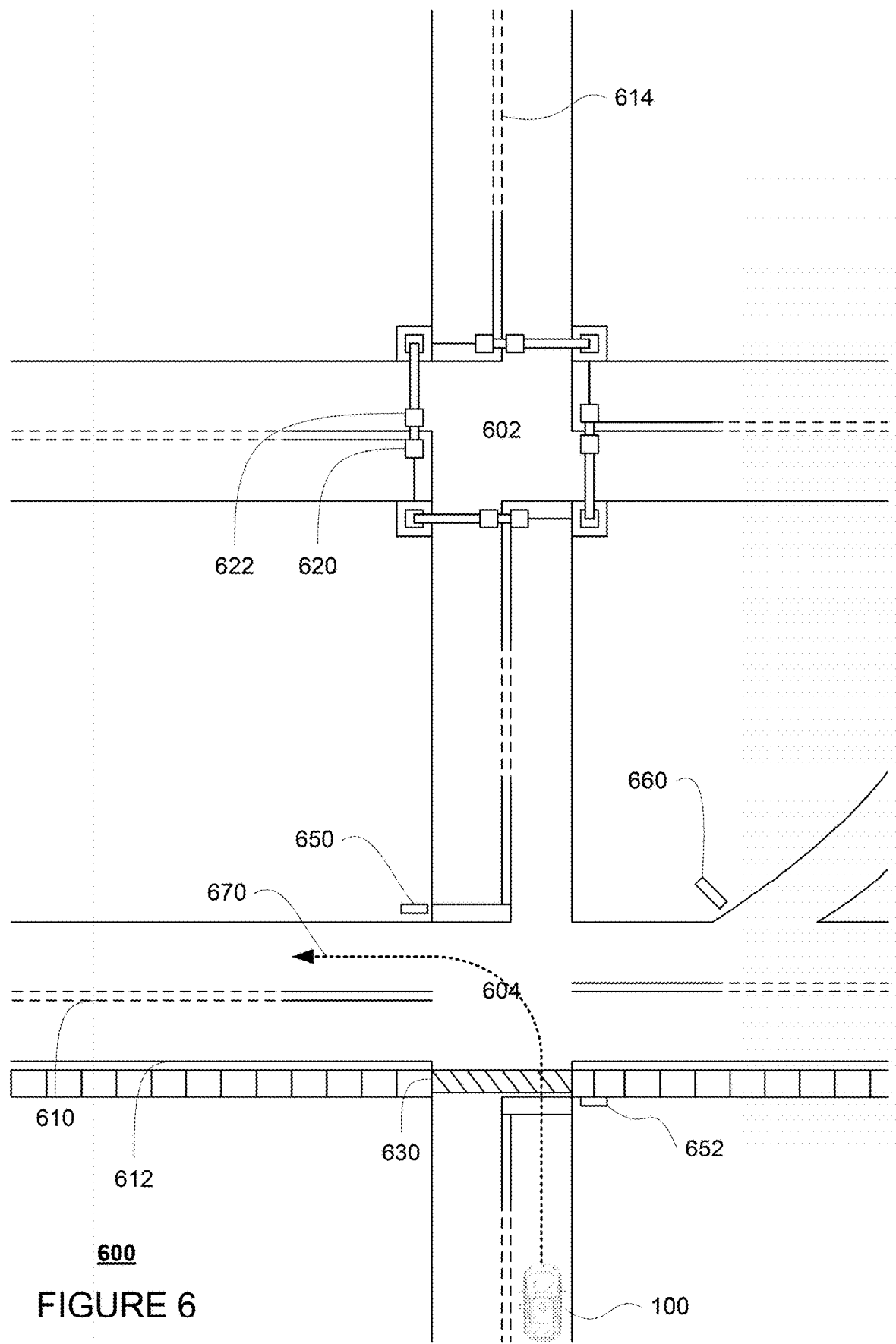
FIG. 6 is a view of a section of roadway in accordance with aspects of the disclosure.

FIG. 6 is an example bird's eye view of a section of roadway including intersections 602 and 604 that correspond to intersections 202 and 204 of map information 200 for 202 and 204. In this example, lane lines 610, 612, 614 correspond to lane lines 210, 212, 214, traffic signal lights 620, 622 correspond to traffic signal lights 220, 222, crosswalk 630 corresponds to crosswalk 230, stop signs 650, 652 correspond to stop signs 250, 252, and yield sign 660 corresponds to yield sign 260.

In many cases, when following the route, the vehicle's computing devices will have to control the vehicle in order to make various turns. For instance, a vehicle may have to make a right turn, left turn, or cross at an intersection. Making a right turn may involve merging into a lane of traffic, whereas making a left turn may involve crossing over one or more lanes of traffic and merging into another lane of traffic. Referring to FIG. 6, vehicle 100 is approaching intersection 604 (intersection 204) while following route 670. Referring to FIG. 2, route 670 corresponds to vehicle following rail 274, transitioning to rail 272 and finally to rail 270 in order to make a left turn at intersection 204.

Figure 7:
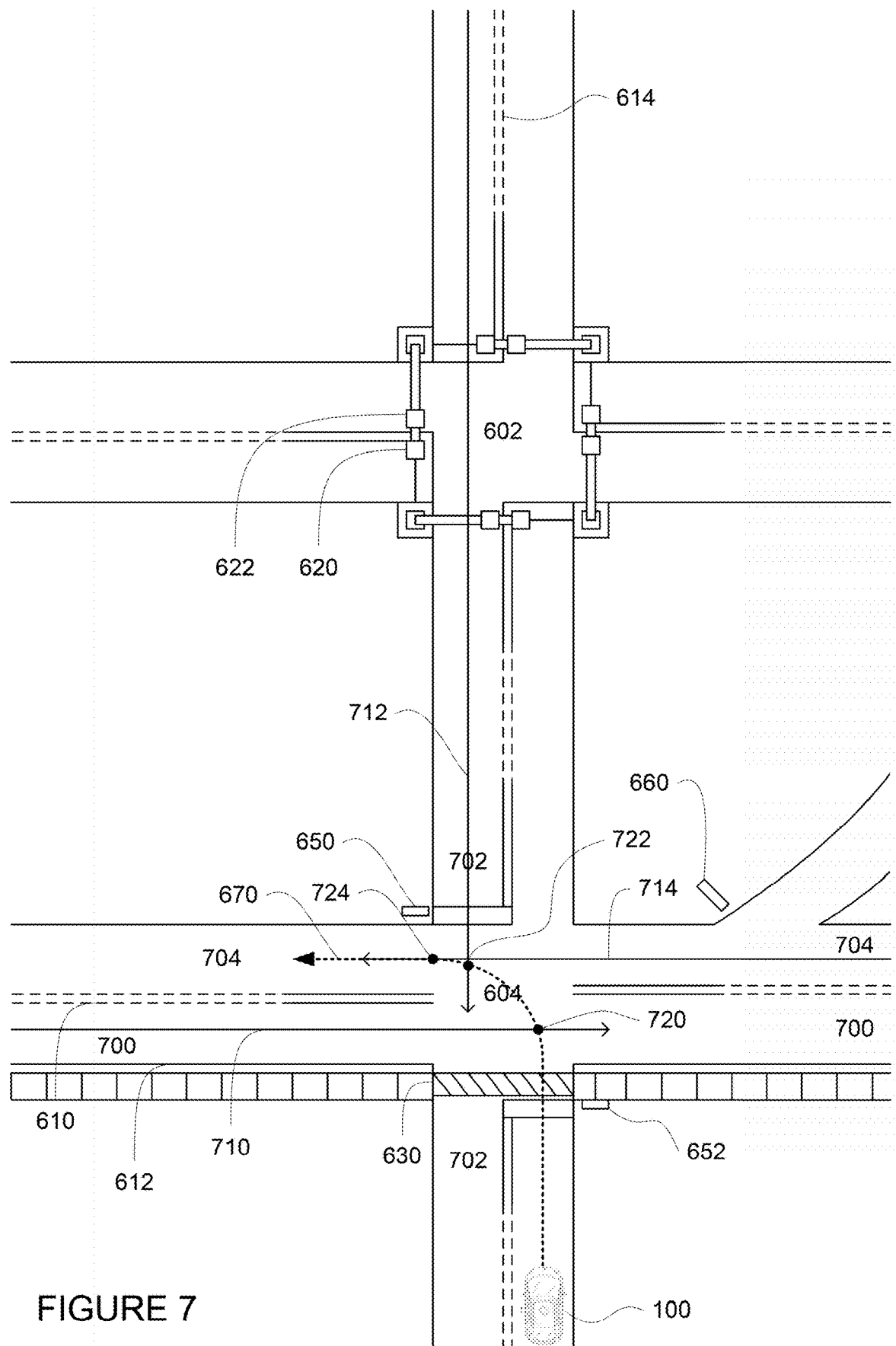
FIG. 7 is a view of a section of roadway and data in accordance with aspects of the disclosure.

These maneuvers (crossings and turns) may create situations in which the location (on the vehicle) and range of the vehicle's sensors (at that location) may limit the distance that the vehicle's computing devices can "see" in the lanes with which the vehicle needs to cross or merge. As an example, when stopped to make a an unprotected left hand turn as shown in FIGS. 6 and 7, for instance where there is no light, stop sign, etc. which would provide the vehicle with the right of way over other lanes of traffic, the vehicle may need to cross a first lane 700 and a second lane 702 and merge with a third lane 704. Arrows 710, 712, and 714 correspond to a general path of a vehicle approaching intersection 604 from each of the three lanes 700, 702, 704. Each of these arrows 710, 712, and 714 crosses route 670 at different points 720, 722, and 724 along the turn. Points 720, 722, and 724 therefore represent locations where a vehicle traveling in each of the three lanes could possibly intersect the route 670.

Figure 8:
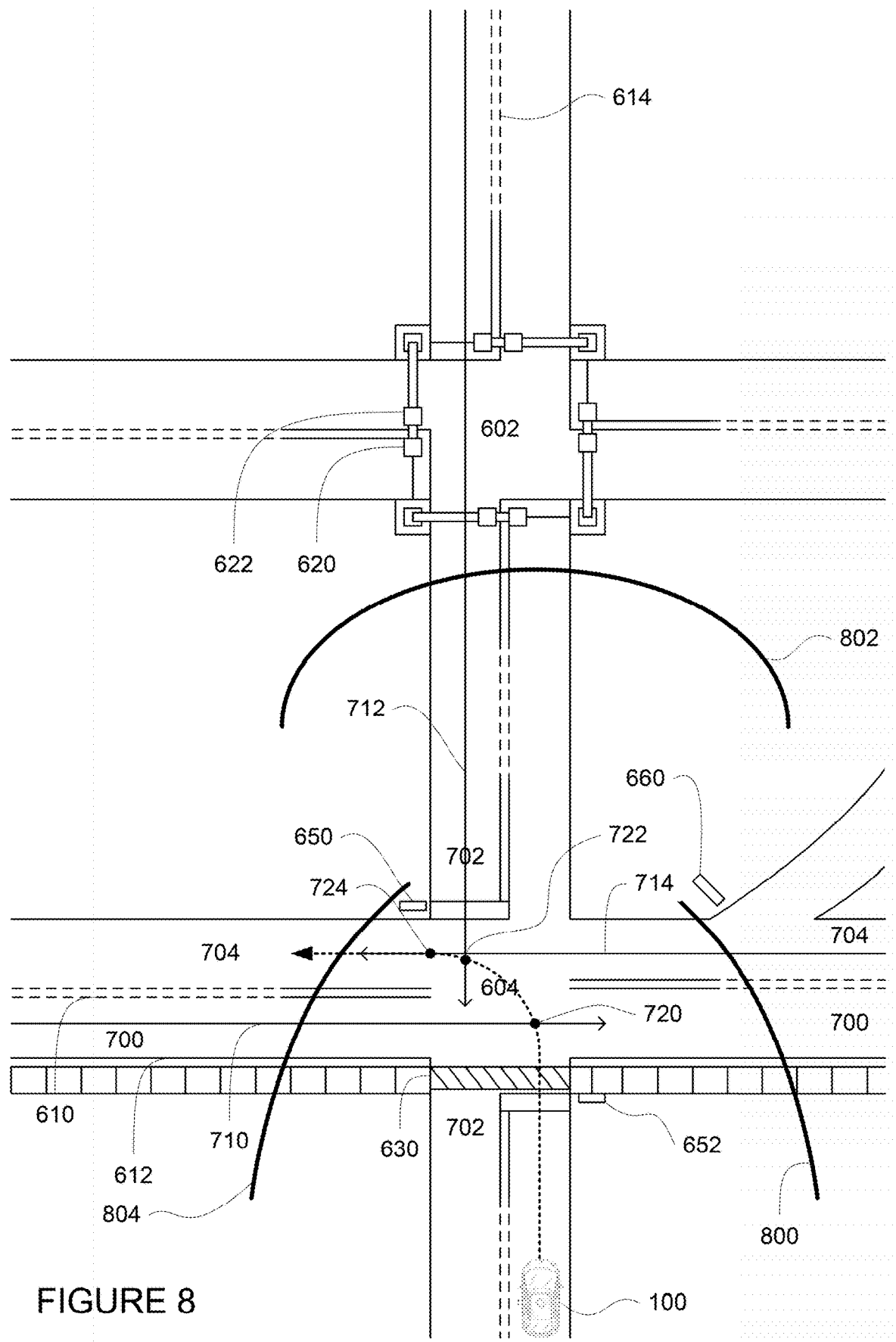
FIG. 8 is another view of a section of roadway and data in accordance with aspects of the disclosure.

In some cases, other vehicles may be located at a point beyond the range of the vehicle's sensors, especially in the lateral directions. For example, referring to FIG. 8, arcs 800, 802, and 804 represent a sensor range that corresponds to the combined field of views of the sensors of the perception system 172. As can be seen, each of arrows 710, 712, and 714 could begin at a point beyond the arcs. Thus, beyond the sensor range represented by the arcs, the vehicle's sensors are not able to reliably detect another vehicle approaching the intersection 604 from lanes 700, 702, and 704. In another example, discussed with regard to FIG. 12 below, the other vehicle may be located within the range of the vehicle's sensors, but be occluded by another object or other environmental factor.

Figure 9:
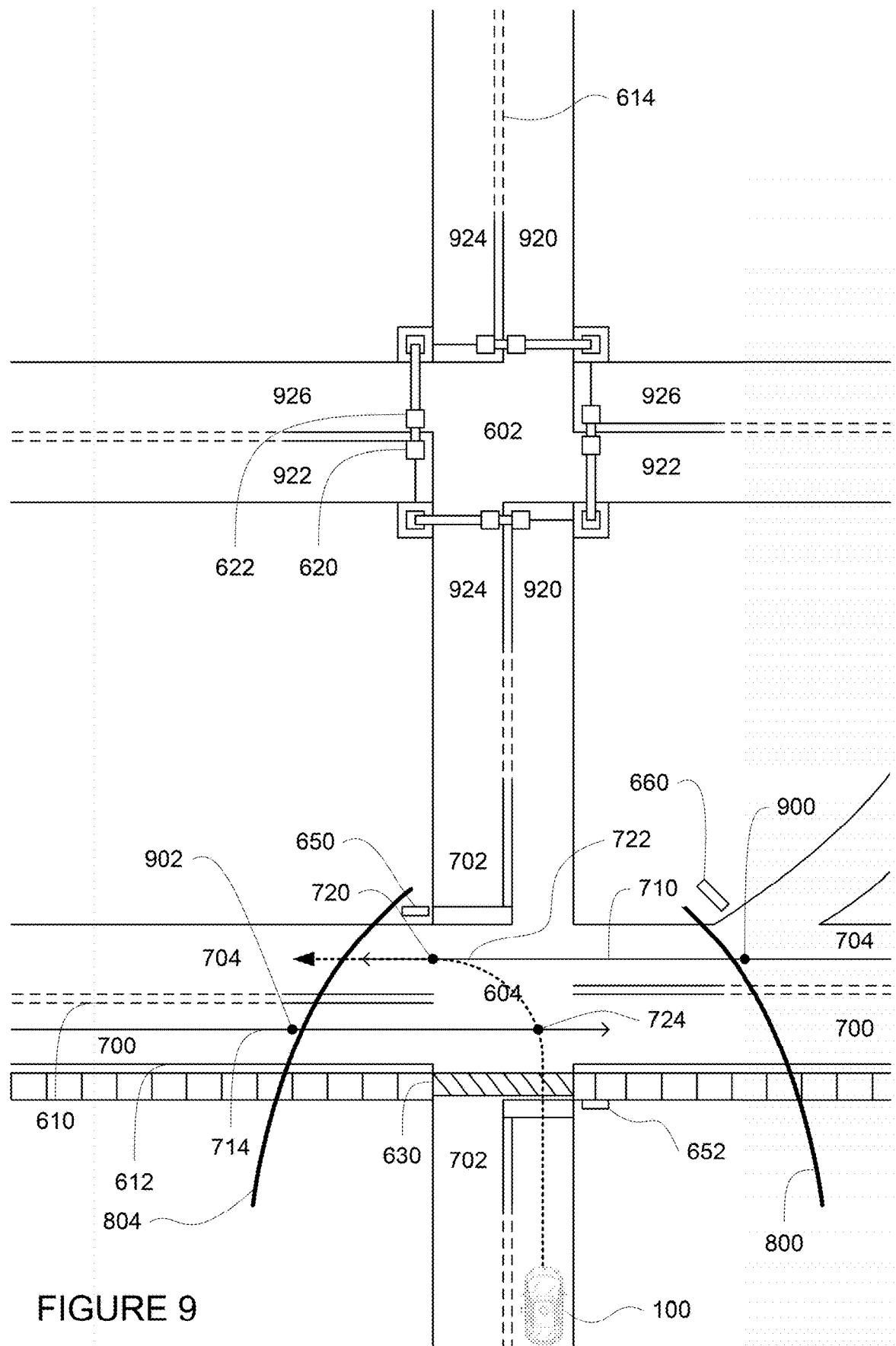
FIG. 9 is a further view of a section of roadway and data in accordance with aspects of the disclosure.

However, if there are vehicles located beyond the sensor range, the computing devices 110 have no way to determine that such vehicles are there. In order to account for a vehicle that may or may not exist in these other lanes, the vehicle's computing devices may select a point in one or more lanes that is at or just beyond the sensor range. For instance, in the example of FIG. 9, two points 900 and 902 are selected beyond the sensor range in lanes 700 and 704. The computing devices 110 may not need to select a point for lane 702, because traffic in lane 702 is required to stop by stop sign 650. Thus, the vehicle 100's turn is protected from oncoming traffic.

In this regard, the location and number of points selected may be determined from the type maneuver being made. For instance, in the example of FIG. 9, where the vehicle is making an unprotected left turn at a stop sign (stop sign 652), the computing devices 110 may select points for the lane 700 as a lane that will be crossed in order to complete the turn and for the lane 704 as a lane that will be merged with in order to complete the turn. In another example, when the vehicle is making an unprotected left turn at a traffic light, such as if the vehicle 100 were approaching intersection 602 from lane 920 and making an unprotected left hand turn into lane 926, the computing devices 110 may select a point in the oncoming lane of traffic 924, but not in the cross lanes of traffic 922 and 926. This is because the vehicle 100 would have the right of way over cross lanes of traffic 922 and 926 (which would have a red light).

In addition, in the case of oncoming traffic, the vehicle's sensors may be able to reasonably detect vehicles that are relatively far away (or significantly farther than laterally approaching vehicles) because such oncoming lanes are generally less obscured or blocked by the environment (houses, trees, other cars, etc.) than lateral lanes. Thus, for oncoming traffic, the computing devices may not always need to select a point for an oncoming lane of traffic even where the vehicle's route is not protected from that lane of traffic.

Figure 10:
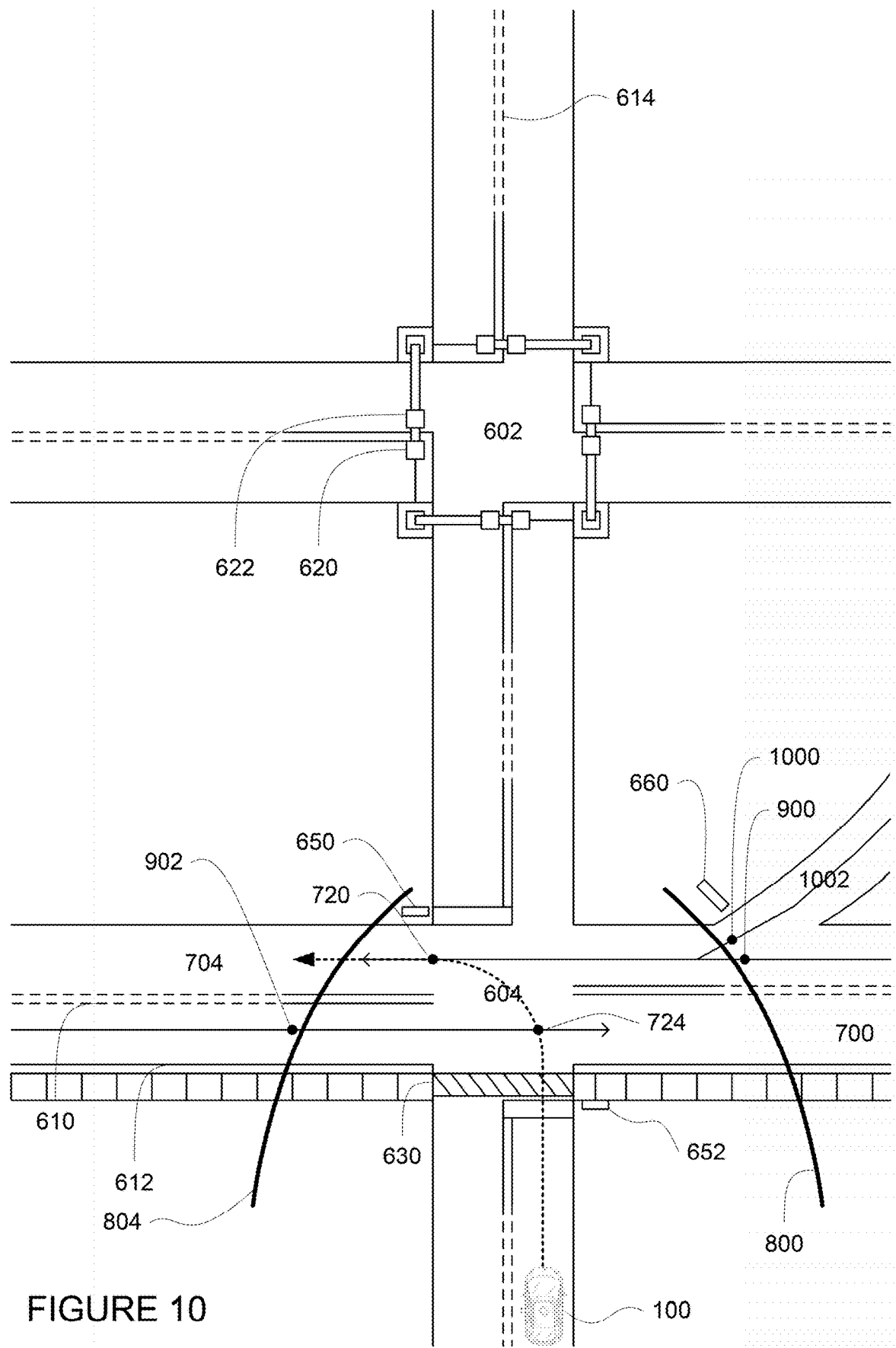
FIG. 10 is yet another view of a section of roadway and data in accordance with aspects of the disclosure.

Additional points may be selected based on the map information. For instance, if a sensor's range ends at or near a merge, the computing devices may select multiple points to correspond to vehicles coming from each section of the merge. As shown in FIG. 10, in addition to selecting points 900 and 902 for each of lanes 704 and 700, respectively, the computing devices 110 may also select point 1000 for a hypothetical vehicle that could be traveling towards intersection 604 from merge lane 1002 that merges with lane 700 just beyond the range represented by arc 800.

Figure 11:
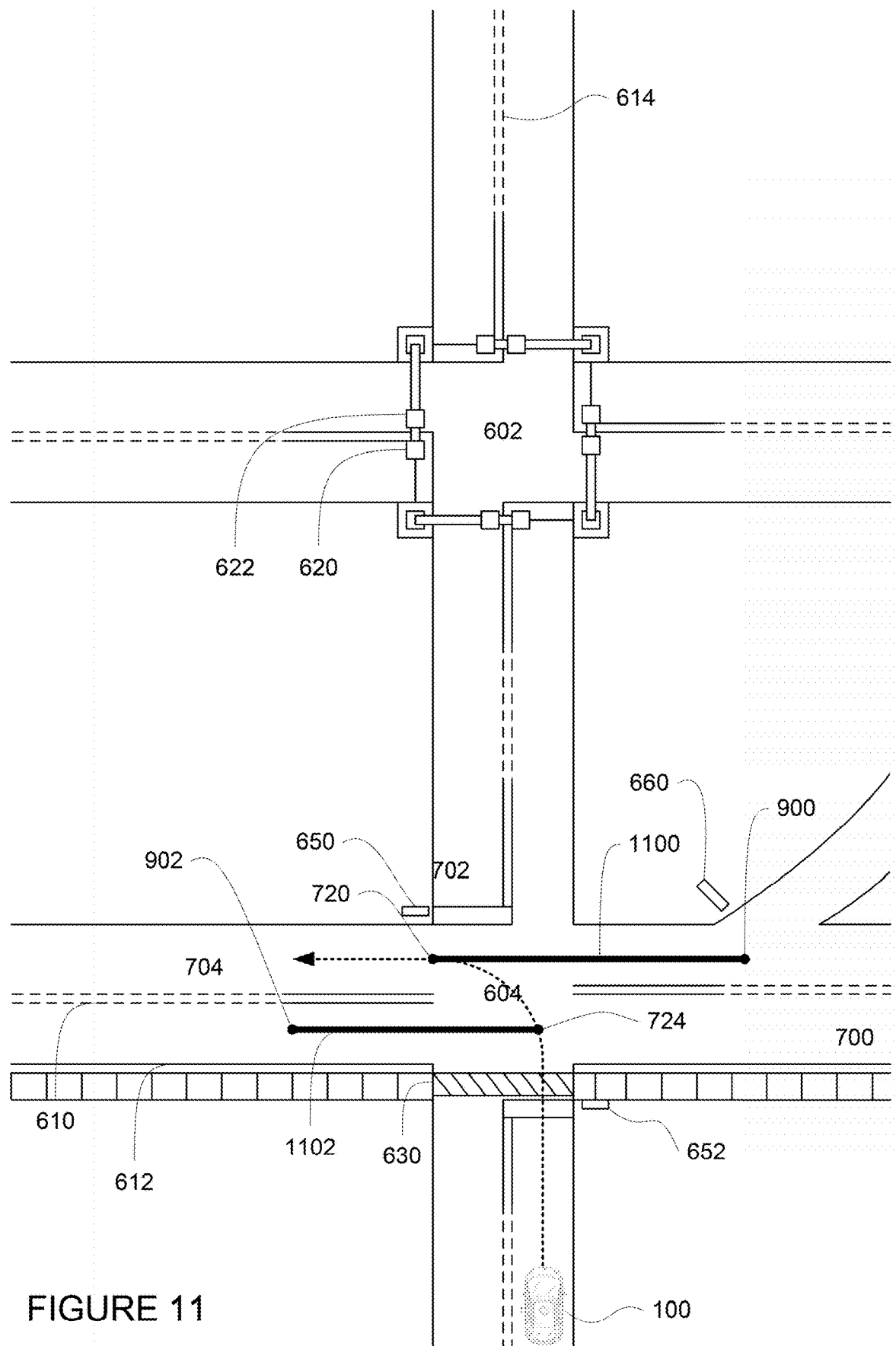
FIG. 11 is yet a further view of a section of roadway and data in accordance with aspects of the disclosure.

Following each lane, the computing devices may then determine a cross point at which a hypothetical vehicle located at the selected point would cross the route. For instance, turning to FIG. 11 (which carries on from the example of FIG. 9), points 720 and 724 also represent cross points at which vehicles traveling in lanes 704 and 700, respectively, would cross route 670.

The computing devices may then determine the distance between each selected point and the corresponding cross point. For instance, referring to FIG. 11, the distance between selected point 900 and point 720 in lane 704 is represented by line 1100. Similarly, the distance between selected point 902 and point 724 in lane 700 is represented by line 1102. The distance may be determined by identifying coordinates for the points and the physical distance between those coordinates, for instance by reference to a coordinate system of the map information 200.

Using the determined distance, the vehicle's computing devices may determine how quickly or an amount of time it would take a hypothetical vehicle to reach each of the cross points from the respective selected point. To do so, the computing devices may make assumptions about the speed of the hypothetical vehicle. For instance, the computing devices may assume that the hypothetical vehicle may move as fast as typical road vehicles are able to travel (i.e. assuming the worst case scenario), some percentage greater than a speed limit for the respective lane (i.e. assuming slightly less than the worst case scenario), or some other relatively high rate of speed.

The amount of time for each cross point may then be compared to a threshold amount of time to determine whether the vehicle can or should complete the maneuver. This threshold amount of time may be determined by estimating an amount of time it would take the vehicle to reach a particular location or complete the maneuver. For instance, if the vehicle is able to reach a particular location that is at least some minimum distance (such as 0, 2, 4, 10 meters or more or less) on the route beyond the cross point, before the hypothetical vehicle would reach the cross point, for each of the cross points and lanes, then the vehicle's computing devices can safely maneuver the vehicle to complete the maneuver. Thus, the threshold amount of time may correspond to an estimated amount of time it would take the vehicle to reach the particular location. In another example, the threshold amount of time may correspond to an estimated amount of time it will take the vehicle to complete the maneuver. In this example, if the vehicle can complete the entire maneuver (complete a turn or cross an intersection) before the hypothetical vehicle would reach the cross point, then the vehicle's computing devices can safely maneuver the vehicle to complete the maneuver.

Of course, this comparing may be repeated for each of the cross points. When the comparisons for each of the cross points indicate that the computing devices 110 can safely maneuver the vehicle to complete the maneuver, then the computing devices may control the vehicle in order to do so. If the vehicle cannot or should not complete the maneuver based on the comparisons for any of the cross points, the computing devices may control the vehicle in order to "better" see in the direction of any of the lanes. This may involve reorienting the vehicle or simply reorienting a sensor relative to the vehicle, slightly moving the vehicle towards completing the maneuver (i.e. pulling forward), or other similar actions.

In many instances, other vehicles may be visible in the lanes with which the vehicle will cross or merge to follow the route. In such cases, the vehicle may not need to perform such calculations for all lanes, but only those lanes that are unoccupied and for which the flow of traffic is towards the vehicle's route. Similarly, if there is a stopped vehicle, this may also obviate the need for the aforementioned determinations. However, in some instances, if there is a stopped or moving vehicle in a lane, the computing devices may use this vehicle as a bound or limit on how quickly another vehicle behind that vehicle could reach the route.

Figure 12:
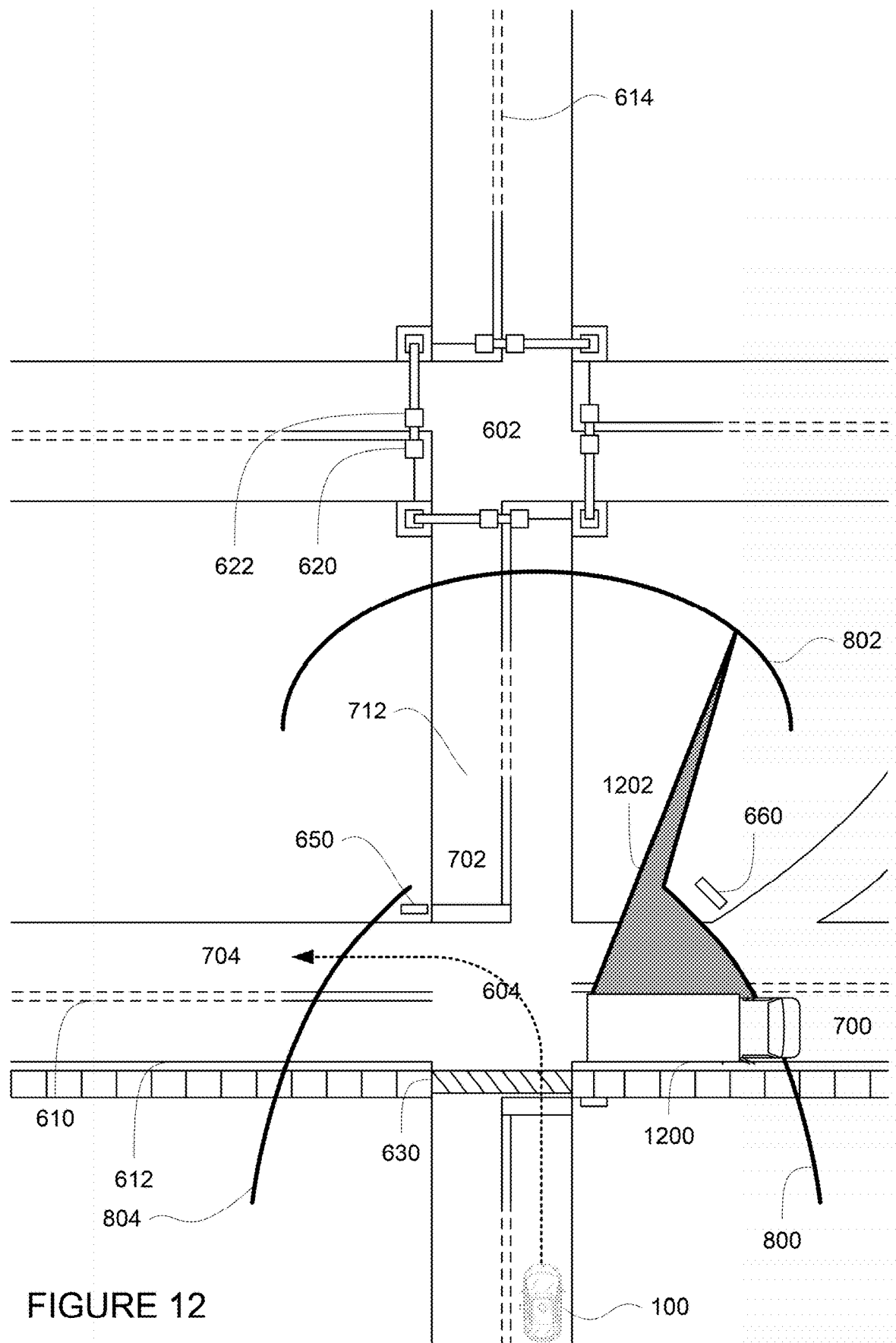
FIG. 12 is a view of a section of roadway and data in accordance with aspects of the disclosure.

In some instances, the range of a sensor may be limited by an object that may or may not be occluding other objects. In an example where the vehicle is making a turn or crossing a two-lane road that is occupied by a first object, areas beyond that first object may be sufficiently large as to hide the presence of another road user (such as a pedestrian, bicyclist, motorcyclist, or other vehicle). For example, as shown in FIG. 12, a tractor trailer 1200 is partially occluding the sensor range within arc 800. As such, area 1202 which would typically have been within the sensor range is now an occluded area. Thus, there could be a vehicle in this area that the perception system 172 is unable to detect.

Figure 13:
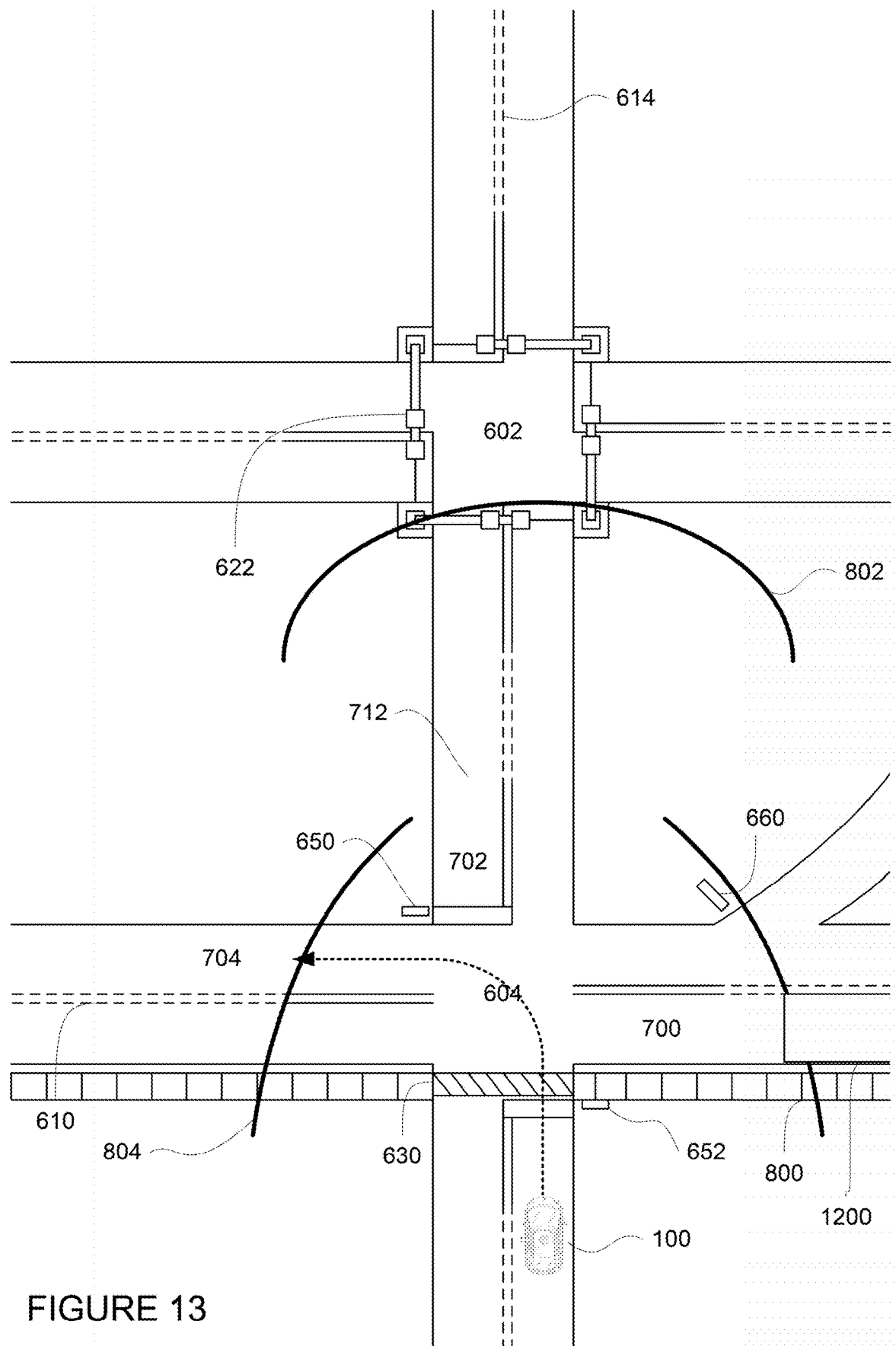
FIG. 13 is another view of a section of roadway and data in accordance with aspects of the disclosure.

In this case, the vehicle's computing devices may make an assumption that a second object, or vehicle, could potentially be present in the area beyond the first object. In addition, the vehicle's computing devices may define the characteristics of that object, including the object's speed according to number of factors or assumptions including for instance, whether there are speed bumps in the path of the other vehicle, assuming limits on lateral acceleration (for instance, a hypothetical vehicle may drive slower than the speed limit on a tight turn for comfort), assumed limits on forward acceleration and/or deceleration, assumptions on whether the other vehicle can see the vehicle 100 and will react to the vehicle 100, presumably by slowing down to give the vehicle 100 room, etc. In one example, the vehicle's computing devices may make an assumption that the second object is traveling at a high rate of speed (at the speed limit, 20 miles over the speed limit, 100 miles per hour, etc.) as a "worst-case scenario". Over time, the likelihood that the second object is traveling at such a high speed and is still occluded by the first object will be reduced, both because the second object will have moved beyond the area and because in some cases the vehicle's sensors may be able to perceive more of the area as the vehicle moves around. For instance, as shown in FIG. 13, the tractor trailer 1200 has moved further down lane 700 and vehicle 100 has moved closer to intersection 604 thus changing the relative position of the tractor trailer 1200 and the sensors of the perception system 172. Thus, it is now evident that there is no occluded object in area 1202 (see FIG. 12). Eventually, the likelihood will be so small, that the vehicle's computing devices will be confident that there is no second object and/or it is safe to proceed past the first object.

Figure 14:
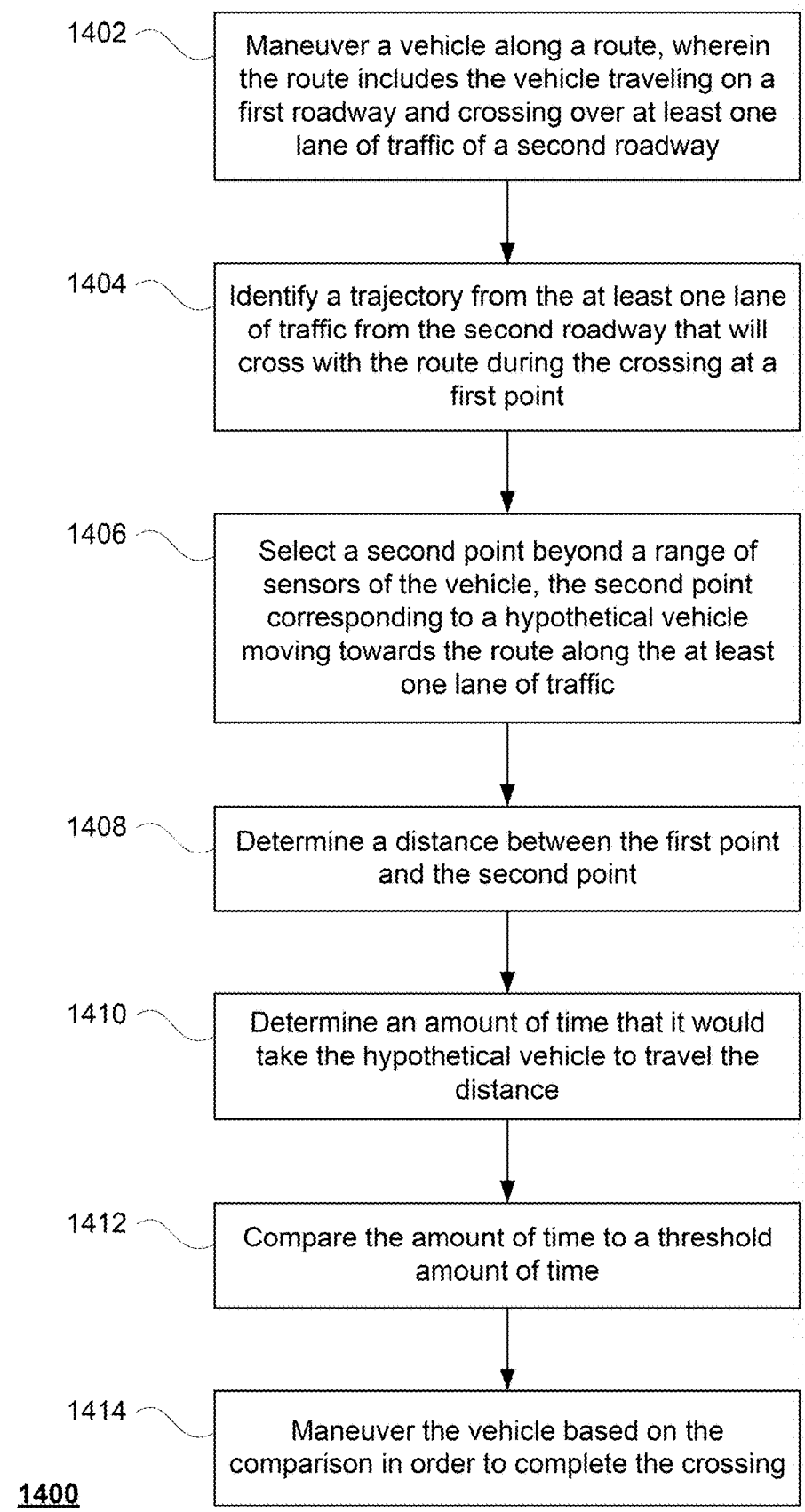
FIG. 14 is a flow diagram in accordance with aspects of the disclosure.

FIG. 14 is an example flow diagram 1400 in accordance which may be performed by one or more processors of one or more computing devices of a vehicle, such as computing devices 110 of vehicle 100 in order to maneuver the vehicle 100 in an autonomous driving mode. In this example, a vehicle is maneuvered along a route at block 1402. The route includes the vehicle traveling on a first roadway and crossing over at least one lane of traffic of a second roadway. At block 1404, a trajectory from the at least one lane of traffic from the second roadway that will cross with the route at a first point is identified. A second point beyond a range of sensors of the vehicle is selected at block 1406. The second point corresponds to a hypothetical vehicle moving towards the route along the at least one lane of traffic. A distance between the first point and the second point is determined at block 1408. An amount of time that it would take the hypothetical vehicle to travel the distance is determined at block 1410. The amount of time is compared to a threshold amount of time at block 1412. The vehicle is maneuvered based on the comparison in order to complete the crossing at block 1414.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for maneuvering a vehicle, the method comprising:
   maneuvering, by one or more processors of one or more computing devices, the vehicle along a route, wherein the route includes the vehicle making an unprotected turn across at least one lane of traffic;
   identifying, by the one or more processors, a path from which a hypothetical vehicle traveling in the at least one lane of traffic will cross with the route during the unprotected turn at a first point;
   identifying a second point along the path, the second point being located beyond a visible range of sensors of the vehicle;
   estimating, by the one or more processors, a value based on the hypothetical vehicle in the at least one lane traveling from the second point to the first point; and
   maneuvering, by the one or more processors, the vehicle based on the estimated value in order to complete the unprotected turn, wherein the hypothetical vehicle corresponds to an occluded vehicle that a perception system of the vehicle having at least one sensor is unable to detect when the vehicle is making the unprotected turn.

2. The method of claim 1, wherein the estimated value is a distance the hypothetical vehicle would travel to reach the first point from the second point.

3. The method of claim 1, wherein the estimated value is a speed of the hypothetical vehicle.

4. The method of claim 1, wherein the estimated value is further estimated based on whether there is a speed bump in the path.

5. The method of claim 1, wherein the estimated value is further based on a limit on one of at least one of an acceleration or a deceleration for the hypothetical vehicle.

6. The method of claim 1, wherein the estimated value is estimated further based on an assumption as to whether the hypothetical vehicle is able to perceive the vehicle.

7. The method of claim 1, wherein the estimated value is a time for the hypothetical vehicle to reach the first point from the second point.

8. The method of claim 1, wherein identifying the second point involves tracing along the path.

9. The method of claim 1, wherein identifying the path is further based on whether a portion of the at least one lane of traffic detected by one or more sensors of the vehicle is occupied by an object.

10. The method of claim 9, wherein the object is a stopped vehicle.

11. The method of claim 1, wherein identifying the second point includes identifying the second point in an area within the visible range of sensors which is occluded by an object.

12. A system for maneuvering a vehicle, the system comprising one or more processors configured to:
   maneuver the vehicle along a route, wherein the route includes the vehicle making an unprotected turn across at least one lane of traffic;
   identify a path from which a hypothetical vehicle traveling in the at least one lane of traffic will cross with the route during the unprotected turn at a first point;
   identify a second point along the path, the second point being located beyond a visible range of sensors of the vehicle;
   estimate a value based on the hypothetical vehicle in the at least one lane traveling from the second point to the first point; and
   maneuver the vehicle based on the estimated value in order to complete the unprotected turn, wherein the hypothetical vehicle corresponds to an occluded vehicle that a perception system of the vehicle having at least one sensor is unable to detect when the vehicle is making the unprotected turn.

13. The system of claim 12, wherein the estimated value is a distance the hypothetical vehicle would travel to reach the first point from the second point.

14. The system of claim 12, wherein the estimated value is a speed of the hypothetical vehicle.

15. The system of claim 12, wherein the one or more processors are further configured to estimate the estimated value further based on a limit on one of at least one of an acceleration or a deceleration for the hypothetical vehicle.

16. The system of claim 12, wherein the estimated value is a time for the hypothetical vehicle to reach the first point from the second point.

17. The system of claim 12, wherein identifying the second point involves tracing along the path.

18. The system of claim 12, further comprising the vehicle.

* * * * *